Feb. 27, 1968   L. M. HUDSON   3,370,904
SYMMETRICAL TYPE COPYING PHOTOGRAPHIC
OBJECTIVE OF WIDE FIELD ANGLE
Filed July 1, 1964

| E.F = 100.0mm | B.F = 89.90mm | F.A. = 55° | f/16.0 | | |
|---|---|---|---|---|---|
| LENS | RADII | THICKNESSES | SPACES | $n_D$ | $\nu$ |
| I | $R_1 = 16.17$ | $t_1 = 2.09$ | $S_1 = 0.45$ | 1.6110 | 57.2 |
|   | $R_2 = 40.10$ |   |   |   |   |
| II | $R_3 = 21.88$ | $t_2 = 2.09$ | $S_2 = 4.92$ | 1.6170 | 38.5 |
|   | $R_4 = 12.31$ |   |   |   |   |
| III | $-R_5 = 12.31$ | $t_3 = 2.09$ | $S_3 = 4.92$ | 1.6170 | 38.5 |
|   | $-R_6 = 21.88$ |   |   |   |   |
| IV | $-R_7 = 40.10$ | $t_4 = 2.09$ | $S_4 = 0.45$ | 1.6110 | 57.2 |
|   | $-R_8 = 16.17$ |   |   |   |   |

ALL SCALAR QUANTITIES GIVEN IN MILLIMETERS

LENA M. HUDSON
*INVENTOR*

BY

ATTORNEYS

United States Patent Office 3,370,904
Patented Feb. 27, 1968

3,370,904
SYMMETRICAL TYPE COPYING PHOTOGRAPHIC
OBJECTIVE OF WIDE FIELD ANGLE
Lena M. Hudson, Brighton, N.Y., assignor to Bausch &
Lomb Incorporated, Rochester, N.Y., a corporation of
New York
Filed July 1, 1964, Ser. No. 379,655
2 Claims. (Cl. 350—209)

ABSTRACT OF THE DISCLOSURE

A symmetrical type of projection objective for photographic copying and kindred uses, said objective having a relatively wide field angle and excellent image aberration correction as well as low distortion when working in the region of unity magnification.

---

Figures 1, 2:
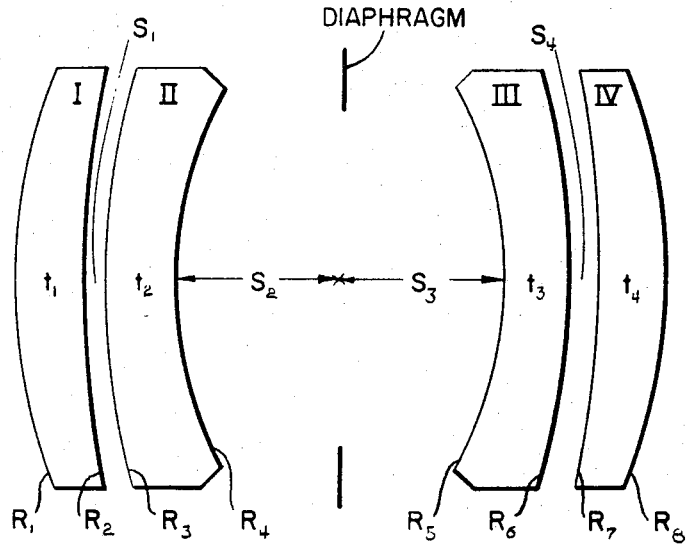

This invention relates to a novel wide field photographic objective of the type having two axially aligned members wherein each member includes two elements.

Copying lenses for use in process work are usually well corrected. Most of the symmetrical lenses of this type are used for a 1 to 1 magnification. Symmetrical objectives for unit magnification are inherently corrected for coma and distortion. However, if such lenses are used for other magnifications such as 0.5× or 1.5× the coma and distortion become noticeable. In order to overcome these problems, the normal approach is to make an unsymmetrical objective by modifying one or more radii in each member so that it differs from its counterpart in the other member.

Advantageously, the novel objective disclosed and claimed herein are sufficiently well corrected for the process work at differing magnification, for example 0.5×, 1:1 and 1.5× magnification. The proper selection of radii, glasses, thicknesses, airspaces and diaphragm distance provides a symmetrical lens which gives good correction for coma and distortion at the various magnifications.

Since the lenses are primarily designed for long focal lengths, i.e., 10 inches or more, the glasses have been selected from those glasses which are readily available in large pieces. The availability of the glass further facilitates producing the lenses in quantities. The proper selection of an average index of refraction facilitates obtaining the glasses. Accordingly an average index of glass has been used for both positive meniscus and both negative meniscus lenses.

Additionally, the proper dispersions have been selected in order to provide excellent color magnification for all three magnifications, 0.5×, 1.0×, and 1.5×.

The lenses according to the present invention are constructed in a manner which should result in additional commercial advantages. For example, the competitive nature of the lens business makes it highly desirable to produce lenses of superior optical preformance while maintaining or reducing the manufacturing costs thereof. The present lenses have improved optical characteristics as set forth in the preceding paragraphs, and also comprise a structure which facilitates manufacturing procedures to thereby reduce the overall cost of the finished lens assemblies. For example, each of the lenses is airspaced to thereby eliminate any costs associated with cementing lenses to one another. Additionally all of the curves throughout the system are sufficiently flat so that the manufacturing of the individual components is relatively inexpensive. Furthermore the glasses used are readily available and relatively inexpensive.

Briefly, the lenses according to the present invention include two axially aligned members, on opposite sides of a central airspace. Each member includes two elements comprising a simple positive meniscus and a simple negative meniscus which are separated from each other by a relatively small airspace. The radii of all the lenses face a center stop. The elements are numbered I through IV and conform substantially to the data set forth in Table A.

TABLE A $0.3863F < F_I < 0.4721F$
$0.4478F < F_{II} < 0.5474F$
$0.4478F < F_{III} < 0.5474F$
$0.3863F < F_{IV} < 0.4721F$
$0.0188F < t_1 < 0.0230F$
$0.0188F < t_2 < 0.0230F$
$0.0188F < t_3 < 0.0230F$
$0.0188F < t_4 < 0.0230F$
$0.0040F < S_1 < 0.0050F$
$0.0443F < S_2 < 0.0541F$
$0.0443F < S_3 < 0.0541F$
$0.0040F < S_4 < 0.0050F$ wherein F is the equivalent focal length of the objective, $F_I$ through $F_{IV}$ are the equivalent focal lengths of the elements I through IV, $t_1$ through $t_4$ are the axial thicknesses of the elements I through IV and $S_1$ through $S_4$ are the axial spacings, the minus (—) sign meaning negative focal length.

The lenses according to the presently preferred embodiment of the invention also conform substantially to the conditions set forth in Table B.

TABLE B $1.606 < n_1 < 1.616$
$1.6120 < n_2 < 1.622$
$1.6120 < n_3 < 1.622$
$1.606 < n_4 < 1.616$
$52.2 < \nu_1 < 62.2$
$33.2 < \nu_2 < 43.5$
$52.2 < \nu_4 < 62.2$ wherein $n_1$ through $n_4$ are the indices of refraction for the glass for the yellow spectral line of helium light for the elements I through IV respectively, and in connection with their color dispersions the numerical value of their respective Abbe numbers are designated by $\nu_1$ through $\nu_4$.

The invention will now be described by reference to the accompanying drawings; in which;

FIG. 1 is an axial section through an objective system embodying the present invention; and FIG. 2 is a table showing the constructional data for an objective system according to the presently preferred embodiment of the invention.

The distinguishing features of the present invention are achieved by a novel distribution of focal lengths or radii and the thicknesses and spacings of the elements set forth herein. For example, the relationships of the radii to the equivalent focal length are shown in Table C, the minus (—) sign used with certain R designations signifying that such a lens surface is concave toward the front.

TABLE C $0.1455F < R_1 < 0.1779F$
$0.3609F < R_2 < 0.4411F$
$0.1969F < R_3 < 0.2407F$
$0.1108F < R_4 < 0.1354F$
$0.1108F < -R_5 < 0.1354F$
$0.1969F < -R_6 < 0.2407F$
$0.3609F < -R_7 < 0.4411F$
$0.1455F < -R_8 < 0.1779F$

The presently preferred form of the invention also conforms to the following constructional data shown in Table D.

TABLE D

| | |
|---|---|
| $R_1 = 0.1617F$ | $S_1 = 0.0045F$ |
| $R_2 = 0.4010F$ | $S_2 = 0.0492F$ |
| $R_3 = 0.2188F$ | $S_3 = 0.0492F$ |
| $R_4 = 0.1231F$ | $S_4 = 0.0045F$ |
| $-R_5 = 0.1231F$ | $n_1 = 1.6110$ |
| $-R_6 = 0.2188F$ | $n_2 = 1.6170$ |
| $-R_7 = 0.4010F$ | $n_3 = 1.6170$ |
| $-R_8 = 0.1617F$ | $n_4 = 1.6110$ |
| $t_1 = 0.0209F$ | $\nu_1 = 57.2$ |
| $t_2 = 0.0209F$ | $\nu_2 = 38.5$ |
| $t_3 = 0.0209F$ | $\nu_3 = 38.5$ |
| $t_4 = 0.0209F$ | $\nu_4 = 57.2$ |

The lenses disclosed herein have excellent color magnification. The other abberations such as spherical aberrations, astigmatism and curvature of field are all well corrected from 0.5× to 1.5× magnification.

The costs associated with the manufacturing of the lenses have also been reduced by the proper selection of the various parameters in the system. For example, the selection of the glasses together with the use of mild curves tends to minimize the cost of the finished objective.

The structural data set forth in Table C leads to the objective form set forth in the following Table E wherein the equivalent focal length of the system is 100 units.

TABLE E $0.1455 < R_1 < 0.1779$
$0.3609 < R_2 < 0.4411$
$0.1969 < R_3 < 0.2407$
$0.1108 < R_4 < 0.1354$
$0.1108 < -R_5 < 0.1354$
$0.1969 < -R_6 < 0.2407$
$0.3609 < -R_7 < 0.4411$
$0.1455 < -R_8 < 0.1779$
$0.0188 < t_1 < 0.0230$
$0.0188 < t_2 < 0.0230$
$0.0188 < t_3 < 0.0230$
$0.0188 < t_4 < 0.0230$
$0.0040 < S_1 < 0.0050$
$0.0443 < S_2 < 0.0541$
$0.0443 < S_3 < 0.0541$
$0.0040 < S_4 < 0.0050$

The complete data for the lens system according to the presently preferred embodiment of the invention is set forth in the accompanying Table F and shown in FIG 2.

TABLE F

E.F. = 100.0 mm.  B.F. = 89.90 mm.  F.A. = 55°  f/16.0

| Lens | Radii | Thicknesses | Spaces | $n_D$ | $\nu$ |
|---|---|---|---|---|---|
| I | $R_1 = 16.17$ | $t_1 = 2.09$ | | | |
|   | $R_2 = 40.10$ | | | | |
|   |               | | $S_1 = 0.45$ | 1.6110 | 57.2 |
| II | $R_3 = 21.88$ | $t_2 = 2.09$ | | | |
|    | $R_4 = 12.31$ | | | | |
|    |               | | $S_2 = 4.92$ | 1.6170 | 38.5 |
|    |               | | $S_3 = 4.92$ | 1.6170 | 38.5 |
| III | $-R_5 = 12.31$ | $t_3 = 2.09$ | | | |
|     | $-R_6 = 21.88$ | | | | |
|     |                | | $S_4 = 0.45$ | 1.6110 | 57.2 |
| IV | $-R_7 = 40.10$ | $t_4 = 2.09$ | | | |
|    | $-R_8 = 16.17$ | | | | | wherein $R_1$ to $R_8$ are the radii of the lens surfaces, $t_1$ to $t_4$ are the axial thicknesses, $S_1$ to $S_4$ are the axial spacings, wherein $n$ is the index of refraction and $\nu$ is the Abbe number of the elements I through IV respectively.

The field for 0.5× magnification is 55°, for 1.1× magnification is 42° and for 1.5× magnification is 36°.

While the invention has been described herein above in terms of an example which embodies it, the scope of the invention itself is defined by the accompanying claims.

What is claimed is:

1. An objective lens comprising two axially aligned members disposed on opposite sides of a central airspace, each of said members including two elements comprising a simple positive meniscus and a simple negative meniscus separated from each other by an airspace, the radii of the elements all facing a central stop, said elements conforming substantially to the following conditions wherein $R_1$ to $R_8$ are the successive radii of the surfaces of the elements, $t_1$ to $t_4$ are the successive thickness, $S_1$ to $S_4$ are the successive axial spacings with $S_2$ and $S_3$ being measured to and from the central stop, $n_1$ to $n_4$ and $\nu_1$ to $\nu_4$ are the successive indices of refraction and Abbe numbers of the elements and wherein F is the overall focal length of the objective lens.

| | |
|---|---|
| $R_1 = 0.1617F$ | $S_1 = 0.0045F$ |
| $R_2 = 0.4010F$ | $S_2 = 0.0492F$ |
| $R_3 = 0.2188F$ | $S_3 = 0.0492F$ |
| $R_4 = 0.1231F$ | $S_4 = 0.0045F$ |
| $-R_5 = 0.1231F$ | $n_1 = 1.6110$ |
| $-R_6 = 0.2188F$ | $n_2 = 1.6170$ |
| $-R_7 = 0.4010F$ | $n_3 = 1.6170$ |
| $-R_8 = 0.1617F$ | $n_4 = 1.6110$ |
| $t_1 = 0.0209F$ | $\nu_1 = 57.2$ |
| $t_2 = 0.0209F$ | $\nu_2 = 38.5$ |
| $t_3 = 0.0209F$ | $\nu_3 = 38.5$ |
| $t_4 = 0.0209F$ | $\nu_4 = 57.2$ |

2. An objective lens comprising two axially aligned members disposed on opposite sides of a central airspace, each of said members including two elements comprising a simple positive meniscus and a simple negative meniscus separated from each other by an airspace, the radii of the elements all facing a central stop, said elements conforming substantially to the following conditions wherein $S_2$ and $S_3$ are the axial spaces between the central stop and the front and rear adjacent lens elements II and III respectively.

E.F. = 100.0 mm.  B.F. = 89.90mm.  F.A. = 55°  f/16.0

| Lens | Radii | Thicknesses | Spaces | $n_D$ | $\nu$ |
|---|---|---|---|---|---|
| I | $R_1 = 16.17$ | $t_1 = 2.09$ | | | |
|   | $R_2 = 40.10$ | | | | |
|   |               | | $S_1 = 0.45$ | 1.6110 | 57.2 |
| II | $R_3 = 21.88$ | $t_2 = 2.09$ | | | |
|    | $R_4 = 12.31$ | | | | |
|    |               | | $S_2 = 4.92$ | 1.6170 | 38.5 |
|    |               | | $S_3 = 4.92$ | 1.6170 | 38.5 |
| III | $-R_5 = 12.31$ | $t_3 = 2.09$ | | | |
|     | $-R_6 = 21.88$ | | | | |
|     |                | | $S_4 = 0.45$ | 1.6110 | 57.2 |
| IV | $-R_7 = 40.10$ | $t_4 = 2.09$ | | | |
|    | $-R_8 = 16.17$ | | | | |

References Cited

UNITED STATES PATENTS 3,263,562  8/1966  Lowenthal _____ 350—221

DAVID H. RUBIN, *Primary Examiner.*

R. J. STERN, *Assistant Examiner.*

UNITED STATES PATENT OFFICE
CERTIFICATE OF CORRECTION

Patent No. 3,370,904            February 27, 1968

Lena M. Hudson

It is certified that error appears in the above identified patent and that said Letters Patent are hereby corrected as shown below:

Column 2, TABLE B, line 6, "$33.2< \nu_2 <43.5$" should read -- $33.5< \nu_2 <43.5$ --. same table, between lines 6 and 7, insert -- $33.5< \nu_3 <43.5$ --.

Signed and sealed this 18th day of November 1969.

(SEAL)
Attest:

Edward M. Fletcher, Jr.            WILLIAM E. SCHUYLER, JR.
Attesting Officer                  Commissioner of Patents